United States Patent
Shin et al.

(10) Patent No.: US 12,233,601 B2
(45) Date of Patent: Feb. 25, 2025

(54) METHOD FOR CREATING 2D SLICING POLYLINE BASED SUPPORT STRUCTURE FOR 3D PRINTING

(71) Applicant: Korea Electronics Technology Institute, Seongnam-si (KR)

(72) Inventors: Hwa Seon Shin, Yongin-si (KR); Hye In Lee, Anyang-si (KR); Sung Hwan Chun, Seoul (KR); Sung Hun Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 564 days.

(21) Appl. No.: 17/256,880

(22) PCT Filed: Aug. 29, 2019

(86) PCT No.: PCT/KR2019/011038
§ 371 (c)(1),
(2) Date: Dec. 29, 2020

(87) PCT Pub. No.: WO2020/046003
PCT Pub. Date: Mar. 5, 2020

(65) Prior Publication Data
US 2021/0362426 A1   Nov. 25, 2021

(30) Foreign Application Priority Data

Aug. 30, 2018   (KR) .......................... 10-2018-0102697

(51) Int. Cl.
*B29C 64/386* (2017.01)
*B33Y 50/00* (2015.01)
(Continued)

(52) U.S. Cl.
CPC ............ *B29C 64/386* (2017.08); *B33Y 50/00* (2014.12); *G06F 30/10* (2020.01); *G06T 7/12* (2017.01); *G06T 17/10* (2013.01); *G06F 2113/10* (2020.01)

(58) Field of Classification Search
CPC ........ B29C 64/386; B33Y 50/00; G06T 7/12; G06T 17/10; G06F 30/10; G06F 2113/10
See application file for complete search history.

(56) References Cited

U.S. PATENT DOCUMENTS

2009/0304952 A1* 12/2009 Kritchman ............. B33Y 10/00
427/256
2010/0121476 A1* 5/2010 Kritchman ............ B29C 64/386
700/119
(Continued)

FOREIGN PATENT DOCUMENTS

EP        3203443 A2 * 8/2017   ........... B29C 64/141
JP    2006-008342 A    1/1994
(Continued)

OTHER PUBLICATIONS

Hwa Seon Shin et al.; "An Effective Data Structure for a 3D Printing Slicer API"; 2016 IEEE International Conference on Consumer Electronics-Asia (ICCE-Asia) (Year: 2016).*
(Continued)

*Primary Examiner* — Rehana Perveen
*Assistant Examiner* — Nupur Debnath
(74) *Attorney, Agent, or Firm* — NSIP Law (57) ABSTRACT

Provided is a method for creating a 2D slicing polyline based support structure for 3D printing. A method for creating a support structure according to an embodiment of the present invention comprises: slicing a 3D model into a plurality of 2D layers; comparing the 2D layers to calculate a support position for each of the 2D layers; and creating supports at the calculated positions. As a result, the supports can be (Continued)

created at precise and meaningful positions, a stable output is possible, and additional slicing work is not necessary on the created supports, whereby improvement of speed can be expected.

16 Claims, 12 Drawing Sheets

(51) Int. Cl.
  *G06F 30/10*   (2020.01)
  *G06F 113/10*  (2020.01)
  *G06T 7/12*    (2017.01)
  *G06T 17/10*   (2006.01)

(56) References Cited

U.S. PATENT DOCUMENTS

| | | | |
|---|---|---|---|
| 2012/0010741 A1 | 1/2012 | Hull et al. | |
| 2015/0151493 A1* | 6/2015 | Schmidt | B29C 64/40 700/98 |
| 2016/0144574 A1* | 5/2016 | Eilken | G06T 19/20 264/129 |
| 2017/0031207 A1* | 2/2017 | Li | B33Y 10/00 |
| 2017/0283596 A1* | 10/2017 | Saito | B33Y 10/00 |
| 2017/0291372 A1* | 10/2017 | Milshtein | B33Y 10/00 |
| 2018/0092690 A1* | 4/2018 | Nair | G06T 19/20 |
| 2018/0229446 A1* | 8/2018 | Bastian | B33Y 30/00 |
| 2018/0250775 A1* | 9/2018 | Spink | B23K 26/034 |
| 2018/0373227 A1* | 12/2018 | Sadusk | H04N 1/00676 |
| 2020/0307108 A1* | 10/2020 | FrantzDale | B29C 64/135 |

FOREIGN PATENT DOCUMENTS

| | | | | |
|---|---|---|---|---|
| JP | 2009-001675 A | | 1/1997 | |
| JP | 2001009920 A | * | 1/2001 | ............ B29C 64/40 |
| JP | 2017-523540 A | | 8/2017 | |
| JP | 2017210650 A | * | 11/2017 | |
| KR | 10-2017-0093661 A | | 8/2017 | |

OTHER PUBLICATIONS

Kyubok Lee et al.; "Slicing algorithms for multi-axis 3-D metal printing of overhangs"; Journal of Mechanical Science and Technology 29 (12) (2015) 5139-5144 (Year: 2015).*
Mohammed A. Isa et al.; "Analysis of build direction in deposition-based additive manufacturing of overhang structures"; Solid Freeform Fabrication 2018: Proceedings of the 29th Annual International Solid Freeform Fabrication Symposium—An Additive Manufacturing Conference Reviewed Paper (Year: 2018).*
J. Vanek et al.; "Clever Support: Efficient Support Structure Generation for Digital Fabrication"; Eurographics Symposium on Geometry Processing 2014; vol. 33 (2014), No. 5 (Year: 2014).*
Hai-ming Zhao et al.; "Inclined layer printing for fused deposition modeling without assisted supporting structure"; Robotics and Computer-Integrated Manufacturing 51 (2018) 1-13 (Year: 2018).*
Yu-an Jin et al.; "Support generation for additive manufacturing based on sliced data"; Int J Adv Manuf Technol (2015) 80:2041-2052 (Year: 2015).*
Toward Support-Free 3D Printing: A Skeletal Approach for Partitioning Models (Year: 2017).*
Korean Office Action issued on Jan. 20, 2020 in corresponding Korean Patent Application No. 10-2018-0102697 (4 pages in English) (6 pages in Korean).

* cited by examiner

(Related Art)

FIG. 3

(Related Art)

When the area of a layer is wide

FIG. 6

When the area of a layer is narrow

METHOD FOR CREATING 2D SLICING POLYLINE BASED SUPPORT STRUCTURE FOR 3D PRINTING

CROSS REFERENCE TO RELATED APPLICATIONS

This application is a U.S. National Stage Application of International Application No. PCT/KR2019/011038, filed on Aug. 29, 2019, which claims the benefit under 35 USC 119 (a) and 365 (b) of Korean Patent Application No. 10-2018-0102697, filed on Aug. 30, 2018, in the Korean Intellectual Property Office, the entire disclosure of which is incorporated herein by reference for all purposes.

TECHNICAL FIELD

The present disclosure relates to three-dimensional (3D) printing-related technology, and more particularly, to a method for creating a support structure of a 3D model for 3D printing.

BACKGROUND ART

Figure 1:
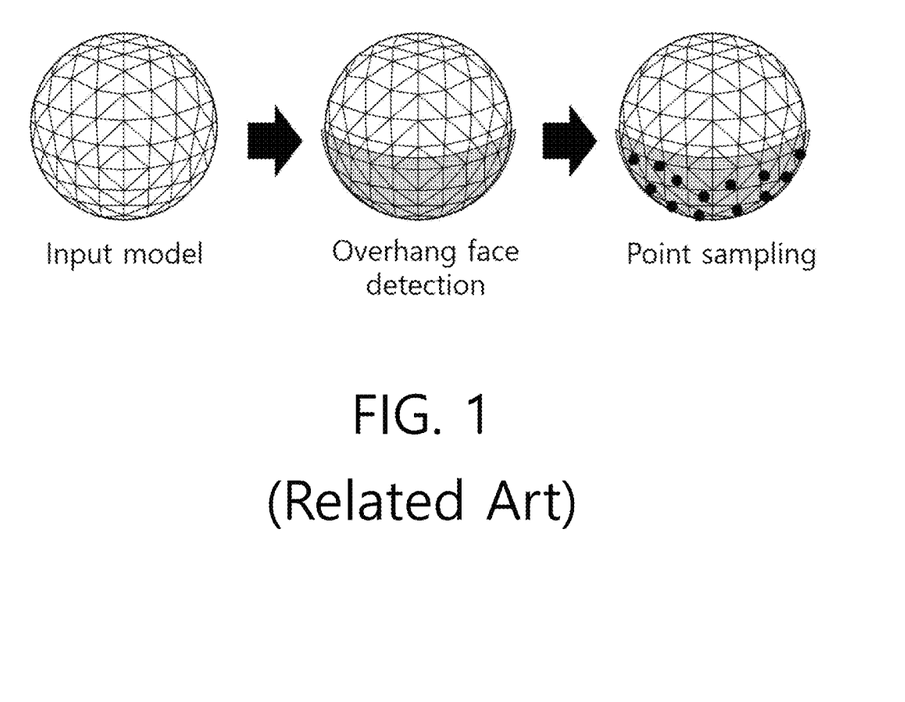
FIG. 1 is a view illustrating a related-art 3D model face-based support position calculation process.

A related-art support structure for 3D printing is created based on face information of an inputted 3D model. Specifically, a face having an overhang angle smaller than a threshold value is detected and a position of a support is calculated by sampling a point. FIG. 1 illustrates a related-art process of calculating a support position based on a 3D model face.

However, since the 3D model is virtual data and a tool path used for real output is data that is generated by slicing the 3D model, there is a problem that the support position calculated by the related-art method does not match real output data.

Specifically, the support positions calculated by the related-art method may be meaningless positions depending on a layer thickness setting value in the process of slicing the 3D model, and a support tip part may be lost and there may be a problem that the support and the model are not attached to each other.

Furthermore, when a digital lighting processing (DLP) method, which is one of the 3D printing methods, is applied, detachment between a support tip and a 3D model may occur due to contraction of a material.

Figure 2:
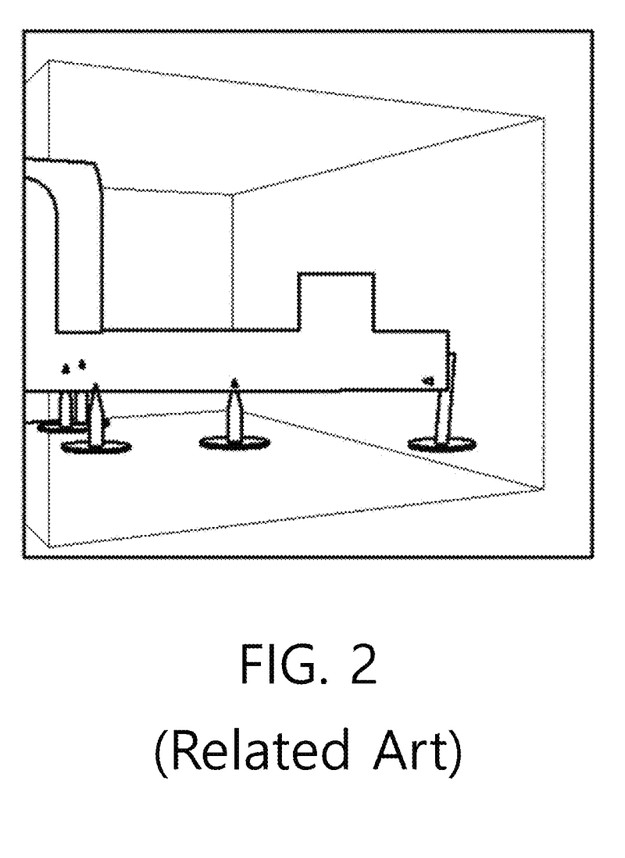
FIGS. 2 and 3 are views illustrating a method for creating a support by inserting the support into a 3D model.
Figure 3:
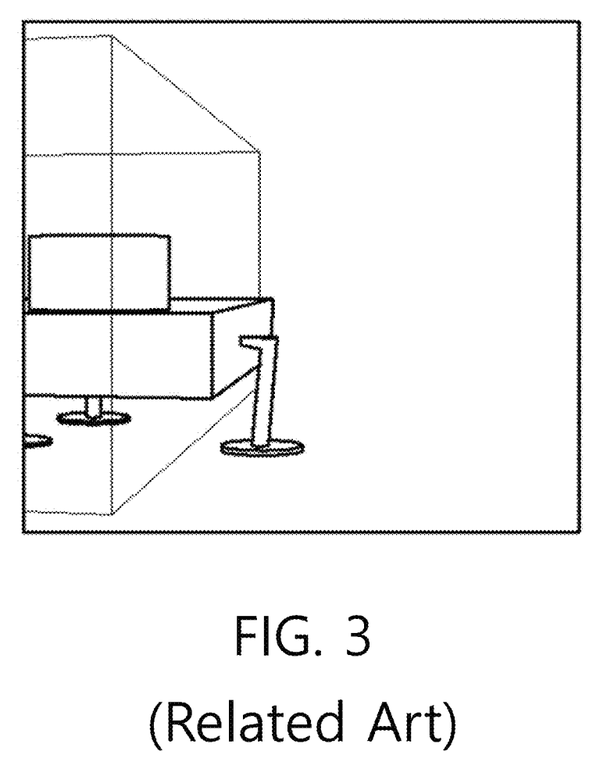

To solve this problem, a method of creating a support by inserting the support into a 3D model may be used as shown in FIGS. 2 and 3. However, when two or more 3D models overlap, a mesh error such as face overlapping or self-intersection may be caused.

DISCLOSURE

Technical Problem

The present disclosure has been developed in order to address the above-discussed deficiencies of the prior art, and an object of the present disclosure is to provide a method and a system for creating a support structure based on polyline information of 2D layers which are generated by slicing a 3D model, as a solution for stable 3D printing.

Technical Solution

According to an embodiment of the present disclosure to achieve the above-described object, a method for creating a support structure includes: slicing a 3D model into a plurality of 2D layers; calculating support positions with respect to the 2D layers by comparing the 2D layers; and creating supports at the calculated positions.

The calculating may include: detecting overhang areas between adjacent 2D layers; segmenting each of the detected overhang areas; and determining center points of the segmented areas as positions of support tips.

In addition, the segmenting may include determining a segmentation resolution based on a size of the detected overhang area.

In addition, the calculating may further include calculating a support tip angle with respect to each of the detected support positions, and the creating may include creating the supports based on the calculated support tip angle.

In addition, the calculating the support tip angle may include calculating the support tip angle by using the calculated support position and polyline information of a lower layer.

In addition, the calculating the support tip angle may include: calculating a point B existing below a support position A and distanced therefrom as long as a layer thickness; calculating a point C on the lower layer closest to the calculated point B; calculating an angle θ formed by the support position A and the point C; and determining the support tip angle based on the calculated angle.

In addition, the determining the support tip angle may include: calculating the other point P of a triangle formed by the support position A, the point C, and an angle 2θ; and determining an angle determined by a direction from the support position A toward the point P as the support tip angle.

In addition, the creating may include: creating a support tip at the detected support positions based on the calculated support tip angle; when the support extends downward from the detected support position, but does not touch the 3D model, creating the support as a support pillar; and, when the support touches the 3D model, creating the support as a support lower tip.

According to another embodiment of the present disclosure, a system for creating a support structure includes: a provider configured to provide a 3D model; and a processor configured to slice the 3D model into a plurality of 2D layers, to calculate support positions with respect to the 2D layers by comparing the sliced 2D layers, and to create supports at the calculated positions.

According to still another embodiment of the present disclosure, a method for creating a support structure includes: calculating support positions with respect to a plurality of 2D layers which are generated by slicing a 3D model by comparing the 2D layers; and creating supports at the calculated positions.

According to yet another embodiment of the present disclosure, a computer-readable recording medium has a program recorded thereon to perform a method for creating a support structure, the method including: slicing a 3D model into a plurality of 2D layers; calculating support positions with respect to the 2D layers by comparing the 2D layers; and creating supports at the calculated positions.

Advantageous Effects

According to embodiments of the present disclosure as described above, a creation position of a support is calculated based on a polyline of a sliced layer which is really printed, so that the supports can be created at more precise and meaningful positions than in a related-art method of calculating a support creation position based on face information of a 3D model.

In addition, according to various embodiments of the disclosure, a density of a support is variably set based on an area of a layer that can be grasped in advance, so that stable 3D printing is possible.

In addition, according to embodiments of the present disclosure, since creation of a support is achieved by creation of a polyline of the support, an additional slicing operation is not required with respect to the created support, and thus improvement of speed can be expected.

In addition, according to embodiments of the present disclosure, even if a DLP method which is one of the 3D printing methods is applied, detachment between a support tip and a 3D model caused by contraction of a material can be prevented without inserting the support into a 3D model as shown in FIGS. 2 and 3.

BEST MODE

Hereinafter, the present disclosure will be described in detail with reference to the accompanying drawings.

A support structure creation method according to an embodiment of the present disclosure may be divided into 1) a support position/angle calculation process and 2) a support creation process. The process "1)" will be described with reference to FIGS. 4 to 8, and the process "2)" will be described with reference to FIGS. 9 to 12.

Figure 4:
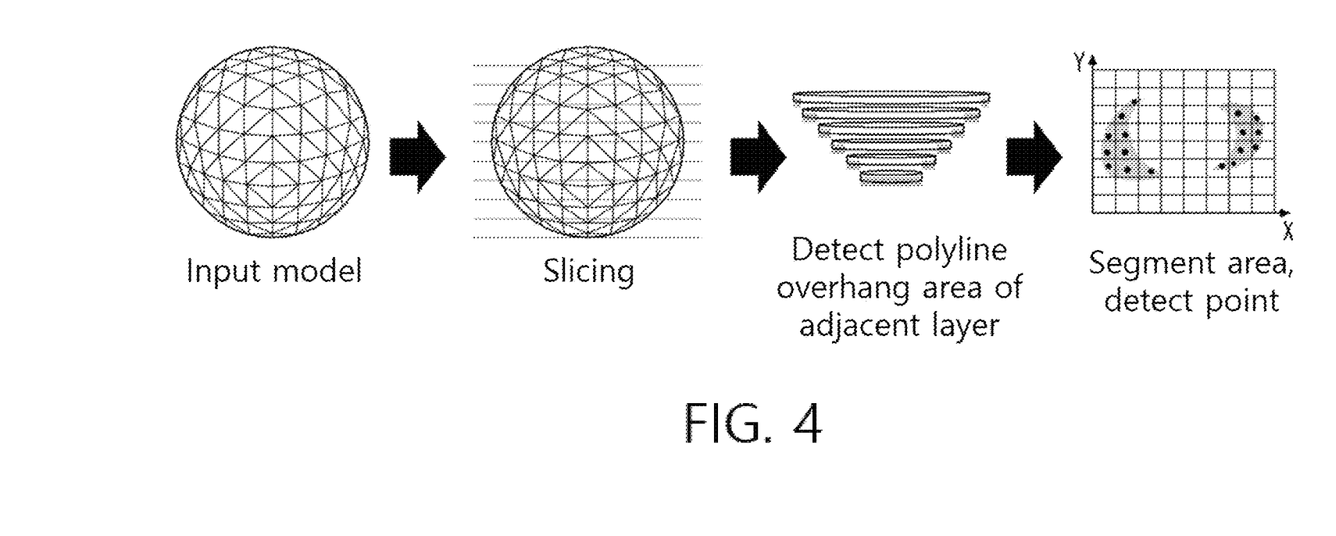
FIG. 4 is a view provided to explain a concept of a support position calculation method applied to an embodiment of the present disclosure.

FIG. 4 is a view provided to explain a concept of a support position calculation method applied to an embodiment of the present disclosure.

In an embodiment of the present disclosure, a support position may be calculated based on polyline information of 2D layers which are generated by slicing a 3D model, not based on 3D model information, as suggested in FIG. 4.

Specifically, overhang areas are detected by comparing polyline information of adjacent 2D layers, and the detected overhang areas are variably segmented, and center points of the segmented areas are determined as support positions.

Figure 5:
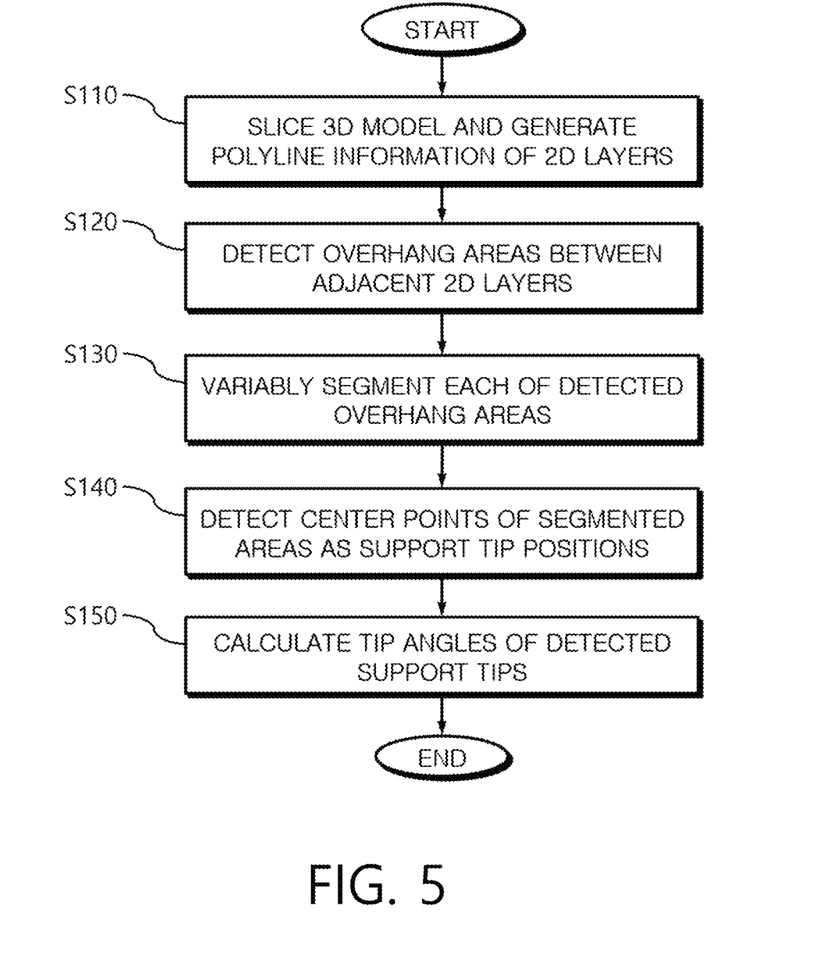
FIG. 5 is a flowchart provided to explain a support position calculation process applied to an embodiment of the present disclosure.

FIG. 5 is a flowchart provided to explain a support position calculation process applied to an embodiment of the present disclosure.

To calculate a support position, a 3D model to be 3D printed is received and is sliced into a plurality of 2D layers (S110) as shown in FIG. 5. At step S110, polyline information of the 2D layers generated by slicing the 3D model are generated.

Overhang areas (differential areas) between adjacent 2D layers are detected by using the polyline information of the 2D layers generated at step S110 (S120).

At step S120, a polyline difference between a current layer and a next layer immediately below the current layer, detected from each layer from the uppermost 2D layer to the lowermost 2D layer, is used in the process of detecting the overhang areas. However, with respect to the lowermost layer, all areas are detected as the overhang areas. A relationship between an overhang area (On) and a 2D layer (Ln) may be expressed by the following equation:

$$O_n = L_n - L_{n-1}, (n>0)$$

$$O_0 = L_0$$

Thereafter, each of the overhang areas detected at step S120 is variably segmented (S130). Specifically, a segmentation resolution is variably operated based on a size of of the detected overhang area.

Figure 6:
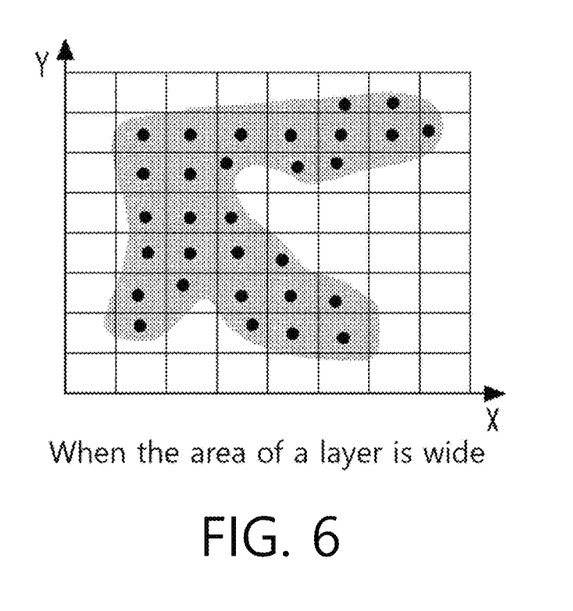
FIGS. 6 and 7 are views provided to explain a method for determining a segmentation resolution according to an overhang area.
Figure 7:
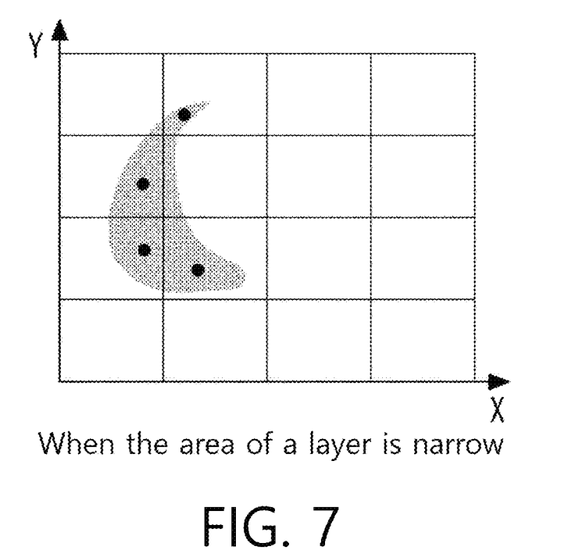

For example, when the overhang area is wide as shown in FIG. 6, a density of a support to be generated is increased by increasing the segmentation resolution. In contrast, when the overhang area is narrow as shown in FIG. 7, a density of a support to be generated is reduced by reducing the segmentation resolution. As a result, output stability can be enhanced, and simultaneously, efficient use of a 3D printing material can be promoted.

In particular, in the case of a printing method of using a resin material and lifting up, such as a DLP printing method or a stereolithography (SLA) printing method, a force of a material attracting a 3D output increases in proportion to an area to be 3D printed. Accordingly, output stability can be increased by adjusting the number of supports variably according to an area of an overhang as in the embodiment of the present disclosure.

Next, respective center points of the areas segmented at step S130 are detected as support positions, more specifically, as support tip positions (S140). At step S140, centers of gravity of the segmented areas may be detected as center points, and center points of the segmented areas may be detected in other methods.

Thereafter, with respect to the support tips detected at step S140, support tip angles (overhang angles) are calculated (S150). The support tip angle is calculated based on the detected center point and polyline information of an adjacent lower layer, and a specific process of calculating the support tip angle will be described hereinbelow with reference to FIG. 8.

Figure 8:
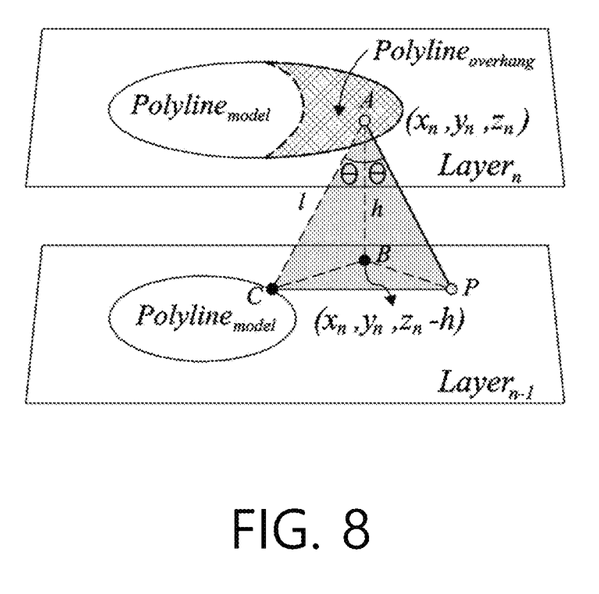
FIG. 8 is a view provided to explain a support tip angle calculation method.

(1) A point "B" positioned below a center point "A" detected on a current layer Layer$_n$ along a Z-axis (that is, on a lower layer Layer$_{n-1}$) and distanced from the point "A" as long as a layer thickness h is acquired.

(2) A point "C" closest to the point "B" from among points constituting the lower layer Layer$_{n-1}$ is acquired.

(3) An angle θ=arcos(h/l) formed by the center point "A" and the point "C" is calculated. Herein, l is a distance between the center point "A" and the point "C".

(4) The other point "P" of the triangle formed by the center point "A", point "C", and an angle 2θ is acquired. Herein, the point "P" is required to be a point constituting the lower layer Layer$_{n-1}$.

(5) An angle determined by a direction from the center point "A" toward the point "P" is determined as a support tip angle.

Hereinafter, a process of creating a support after calculating a position/angle of a support tip will be described in detail.

Figure 9:
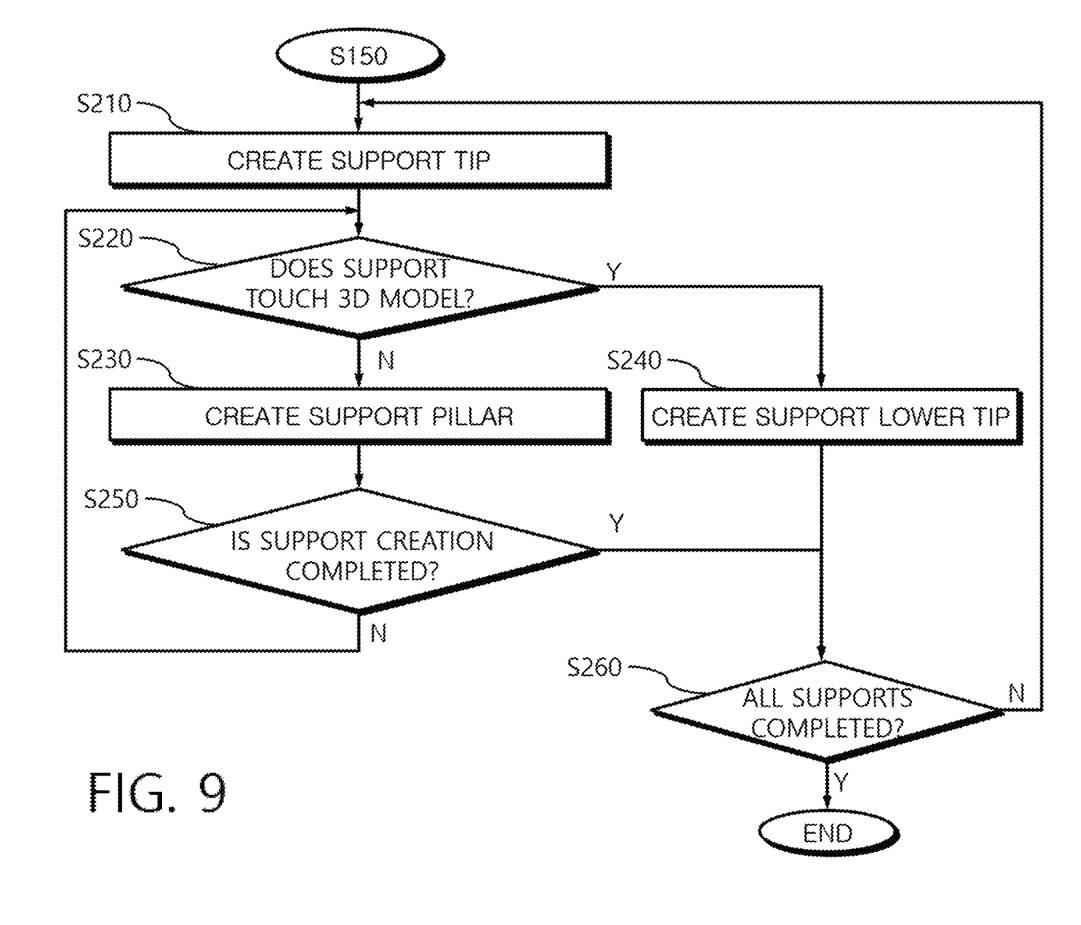
FIG. 9 is a flowchart provided to explain a support creation process applied to an embodiment of the present disclosure.

FIG. 9 is a flowchart provided to explain a support creation process applied to an embodiment of the present disclosure.

To create a support, a support tip is created according to support information (support tip position/angle) calculated by the process illustrated in FIG. 5 (S210) as shown in FIG. 9.

When creation of the support tip is completed, a support pillar and a support lower tip should be created. The support pillar is a part that is directed vertically downwards, and the support lower tip refers to a tip that is formed at a tip of the support toward a 3D output.

Figure 10:
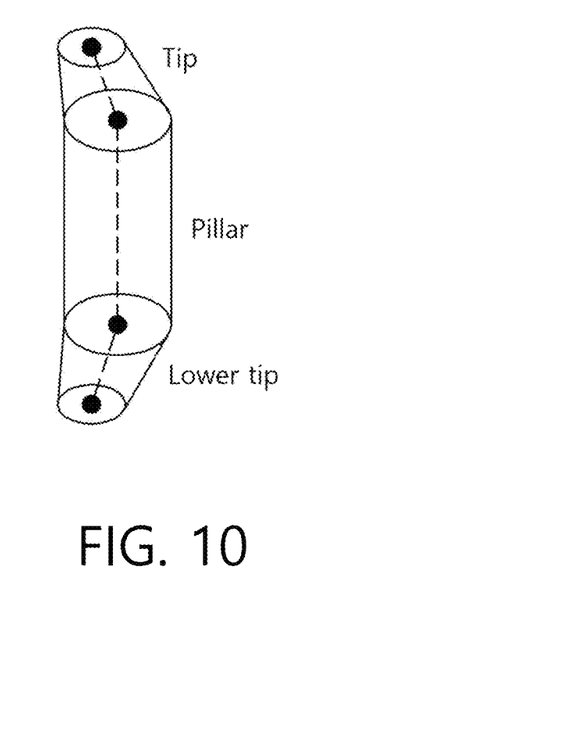
FIG. 10 is a view illustrating a shape of a normal support.
Figure 11:
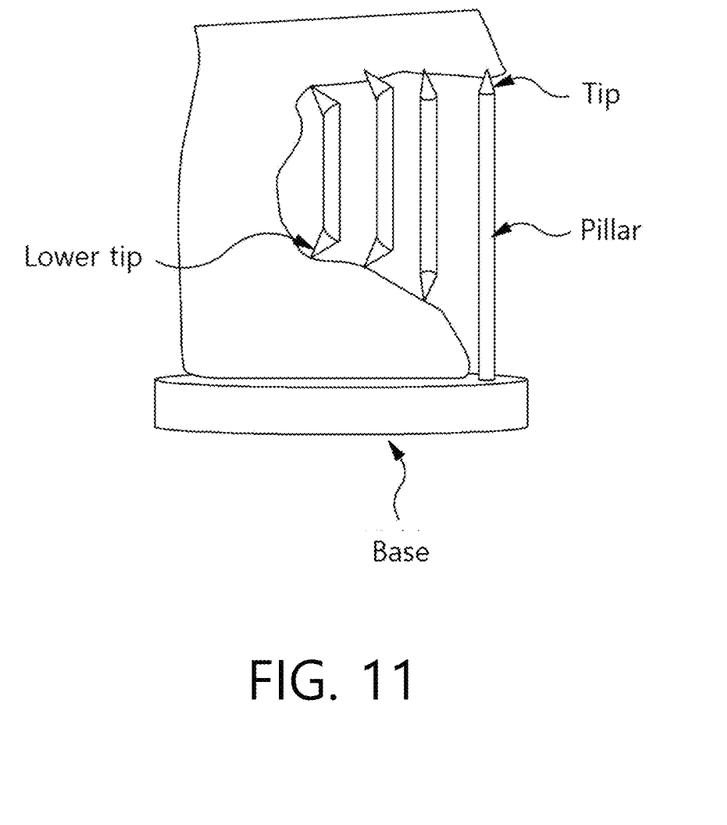
FIG. 11 is a view illustrating really 3D printed supports.

FIG. 10 illustrates a shape of a normal support configured with a support tip, a support pillar, and a support lower tip. FIG. 11 illustrates really 3D printed supports.

As shown in FIG. 11, the support tip and the support pillar are essential for the support, but the support lower tip are not essential. The support lower tip may not be formed in the case of a support the lowermost end of which does not meet a 3D model and meets a base, like the support created on the rightmost side of FIG. 11.

To create the support pillar and the support lower tip, it is determined whether the support on the current layer touches the 3D model (S220). The step S220 is performed based on a method of identifying whether there is an intersection between the polyline of the layer and the polyline of the support pillar.

When it is identified that the support on the current layer does not touch the 3D model (S220-N), the support on the current layer is created as a support pillar (S230).

On the other hand, when it is identified that the support on the current layer touches the 3D model (S230-Y), the support at a height of the current layer is created as a support lower tip (S240). This is to minimize remaining marks in a process of removing the support from the 3D model.

Figure 12:
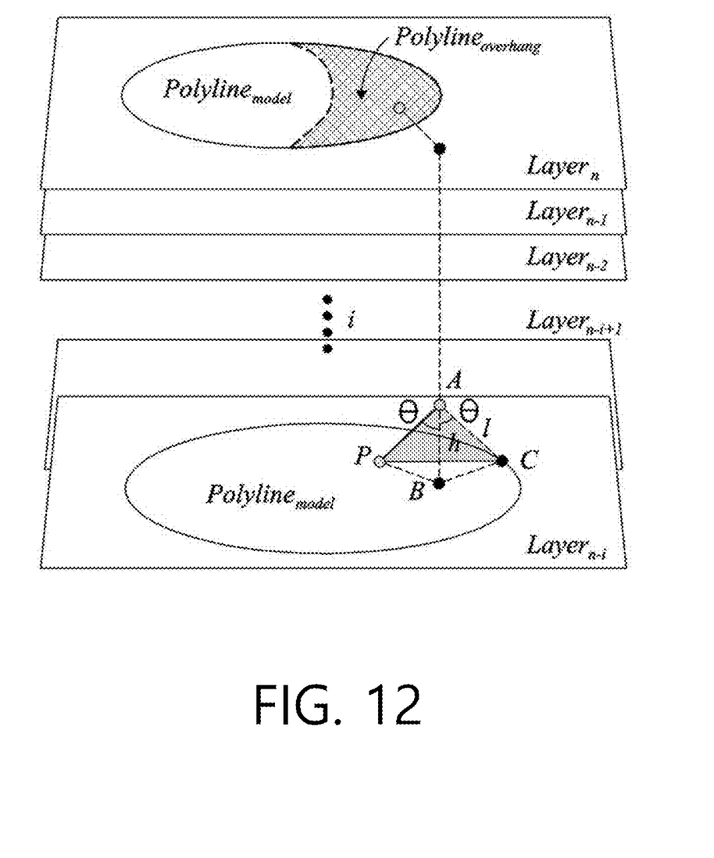
FIG. 12 is a view provided to explain a support lower tip angle calculation method.

FIG. 12 illustrates that, after a support tip is created, a support is created as a support pillar and then is created as a support lower tip. FIG. 12 illustrates a method of calculating a position and an angle of the support lower tip, and a detailed process thereof will be hereinbelow:

(1) A point "B" on an adjacent lower layer Layer$_{n-i}$, that meets a straight line drawn vertically downward from a center point "A" of a support pillar on a current layer Layer$_{n-i+1}$ is acquired.

(2) A point "C" closest to the point "B" from among points constituting the lower layer Layer$_{n-i}$ is acquired.

(3) An angle θ=arcos(h/l) formed by the center point "A" and the point "C" is calculated. Herein, l is a distance between the center point "A" and the point "C".

(4) The other point "P" of the triangle formed by the center point "A", the point "C", and an angle 2θ is acquired. Herein, the point "P" is required to be a point constituting the lower layer Layer$_{n-i}$.

(5) An angle determined by a direction of the center point "A" toward the point "P" is determined as a support lower tip angle.

When the support lower tip is created (S240) or the support pillar is created to the lowermost layer (S250-Y), steps S210 to S250 are performed with respect to the next support.

Steps S210 to S250 are repeated until all supports are completed (S260).

Up to now, the method of creating a support structure based on a 2D slicing polyline for 3D printing has been described with reference to preferred embodiments.

In embodiments of the present disclosure, a support structure is created based on polyline information of 2D layers which are really printed areas, and supports can be exactly and stably created.

Furthermore, since creation of a support is achieved by creation of a polyline of the support in embodiments of the present disclosure, an extra slicing operation is not required for the created support.

In addition, according to an embodiment of the present disclosure, even if a DLP method which is one of the 3D printing methods is applied, detachment between a support tip and a 3D model caused by contraction of a material can be solved. That is, according to an embodiment of the present disclosure, problems can be solved without inserting a support into a 3D model as shown in FIGS. 2 and 3.

Figure 13:
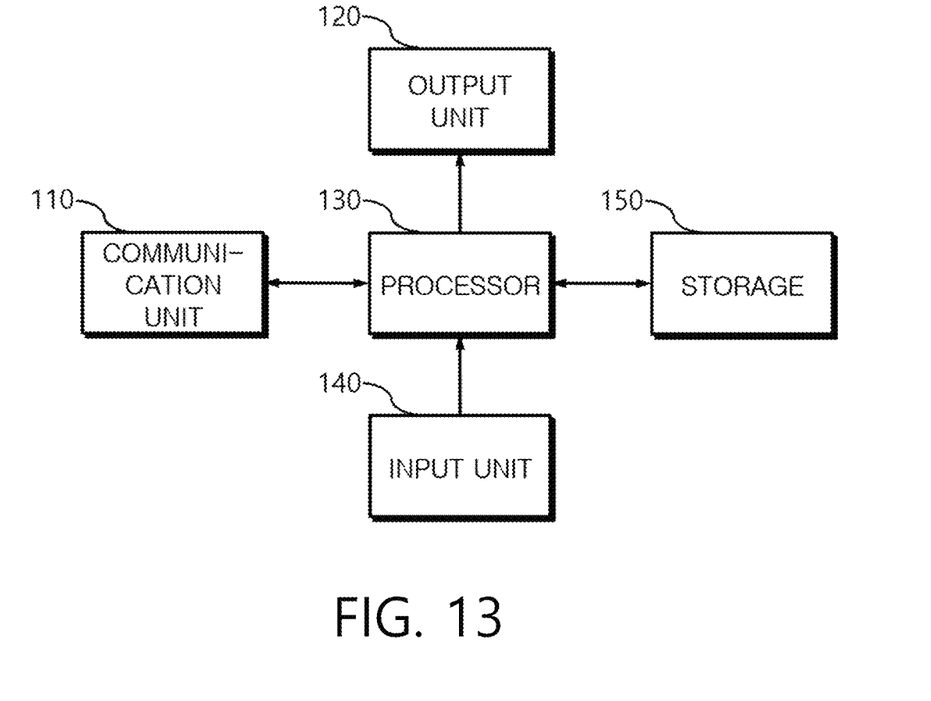
FIG. 13 is a block diagram of a support structure creation system according to another embodiment of the present disclosure.

FIG. 13 is a block diagram of a support structure creation system according to another embodiment of the present disclosure. The support structure creation system according to an embodiment of the present disclosure may be implemented by a computing system including a communication unit 110, an output unit 120, a processor 130, an input unit 140, and a storage 150 as shown in FIG. 13.

The communication unit 110 is a means for communicating with external devices including a 3D printer and connecting to a server, a cloud, or the like through a network, and may transmit, receive, upload and/or download data necessary for 3D printing.

The input unit 140 is a means for receiving setting/command related to 3D printing and creation of a support structure, and the output unit 120 is a display for displaying a screen related to 3D printing and creation of a support structure.

The processor 130 performs the process of calculating the position/angle of the support suggested in FIG. 5 described above, and the support creation process suggested in FIG. 9. The storage 150 provides a storage space necessary for the processor 130 to perform the corresponding processes.

3D model data may be provided to the processor 130 through the communication unit 110 and the storage 150.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical concept or prospect of the present disclosure.

The invention claimed is:

1. A processor-implemented method for creating a support structure, the method comprising:
slicing a 3D model into a plurality of 2D layers;
determining support positions with respect to the plurality of the 2D layers by comparing the plurality of the 2D layers to each other, including detecting overhang areas between adjacent 2D layers, of the plurality of the 2D layers, and segmenting each of the detected overhang areas;
creating supports at the determined positions, including determining a respective density of each of the supports depending on a segmentation resolution determined from the segmenting; and
performing a 3D printing of the 3D model using the supports, while any portion of the supports is not inserted into the 3D model,
wherein the determining the support positions further comprises determining a support tip angle with respect to each of the determined support positions, and
wherein the determining the support tip angle comprises:
determining a point B existing below a support position A, of the determined support positions, and distanced therefrom as long as a layer thickness;
determining a point C on the 3D model in the lower layer closest to the determined point B;
determining an angle θ formed by the support position A and the point C; and
determining the support tip angle based on the determined angle, and
wherein the determining a support lower tip angle comprises:
determining the other point P of a triangle formed by the support position A, the point C, and an angle 2θ; and
determining an angle determined by a direction from the support position A toward the point P as the support lower tip angle.

2. The method of claim 1, wherein the determining comprises comparing polyline information of the 2D layers.

3. The method of claim 1, wherein the determining comprises:
determining center points of the segmented areas as positions of support tips.

4. The method of claim 1, wherein the segmenting comprises determining the segmentation resolution based on a size of the detected overhang area.

5. The method of claim 1,
wherein the creating comprises creating the supports based on the determined support tip angle.

6. The method of claim 1, wherein the determining the support tip angle comprises determining the support tip angle by using the determined support position and polyline information of a lower layer.

7. The method of claim 5, wherein the creating comprises:
creating a support tip at the detected support positions based on the determined support tip angle;
when the support extends downward from the detected support position, but does not touch the 3D model, creating the support as a support pillar; and
when the support touches the 3D model, creating the support as a support lower tip.

8. A system for creating a support structure, the system comprising:
a processor configured to:
provide a 3D model to be 3D printed;
slice the 3D model into a plurality of 2D layers;
determine support positions with respect to the plurality of the 2D layers by comparing the sliced 2D layers, including detecting overhang areas between adjacent 2D layers, of the plurality of the 2D layers, and segmenting each of the detected overhang areas;
create supports at the determined positions, including determining a respective density of each of the supports depending on a segmentation resolution determined from the segmenting; and
perform a 3D printing of the 3D model using the supports, while any portion of the supports is not inserted into the 3D model being printed,
wherein, for the determining the support positions, the processor is further configured to determine a support tip angle with respect to each of the determined support positions, and
wherein, for the determining the support tip angle, the processor is further configured to:
determine a point B existing below a support position A, of the determined support positions, and distanced therefrom as long as a layer thickness;
determining a point C on the 3D model in the lower layer closest to the determined point B;
determining an angle θ formed by the support position A and the point C; and
determining the support tip angle based on the determined angle, and
wherein the determining a support lower tip angle comprises:
determining the other point P of a triangle formed by the support position A, the point C, and an angle 2θ; and
determining an angle determined by a direction from the support position A toward the point P as the support lower tip angle.

9. A processor-implemented method for creating a support structure, the method comprising:
determining support positions with respect to a plurality of 2D layers which are generated by slicing a 3D model by comparing the 2D layers, including detecting overhang areas between adjacent 2D layers, of the plurality of the 2D layers, and segmenting each of the detected overhang areas;
creating supports at the determined positions, including determining a respective density of each of the supports depending on a segmentation resolution determined from the segmenting; and
performing a 3D printing of the 3D model using the supports, while any portion of the supports is not inserted into the 3D model,
wherein the determining the support positions further comprises determining a support tip angle with respect to each of the determined support positions, and
wherein the determining the support tip angle comprises:
determining a point B existing below a support position A, of the determined support positions, and distanced therefrom as long as a layer thickness;
determining a point C on the 3D model in the lower layer closest to the determined point B;
determining an angle θ formed by the support position A and the point C; and determining the support tip angle based on the determined angle, and wherein the determining a support lower tip angle comprises:

determining the other point P of a triangle formed by the support position A, the point C, and an angle 2θ; and determining an angle determined by a direction from the support position A toward the point P as the support lower tip angle.

10. A computer-readable recording medium having a program recorded thereon to perform a method for creating a support structure, the method comprising:

slicing a 3D model into a plurality of 2D layers;

determining support positions with respect to the plurality of the 2D layers by comparing the plurality of the 2D layers, including detecting overhang areas between adjacent 2D layers, of the plurality of the 2D layers, and segmenting each of the detected overhang areas;

creating supports at the determined positions, including determining a respective density of each of the supports depending on a segmentation resolution determined from the segmenting; and performing a 3D printing of the 3D model using the supports, while any portion of the supports is not inserted into the 3D model, wherein the determining the support positions further comprises determining a support tip angle with respect to each of the determined support positions, and wherein the determining the support tip angle comprises:

determining a point B existing below a support position A, of the determined support positions, and distanced therefrom as long as a layer thickness;

determining a point C on the 3D model in the lower layer closest to the determined point B;

determining an angle θ formed by the support position A and the point C; and determining the support tip angle based on the determined angle, and wherein the determining a support lower tip angle comprises:

determining the other point P of a triangle formed by the support position A, the point C, and an angle 2θ; and determining an angle determined by a direction from the support position A toward the point P as the support lower tip angle.

11. The system of claim 8, wherein, for the determining, the processor is further configured to compare polyline information of the 2D layers.

12. The system of claim 8, wherein, for the determining, the processor is further configured to determine center points of the segmented areas as positions of support tips.

13. The system of claim 8, wherein, for the segmenting, the processor is further configured to determine the segmentation resolution based on a size of the detected overhang area.

14. The system of claim 12, wherein, for the creating, the processor is further configured to create the supports based on the determined support tip angle.

15. The system of claim 14, wherein, for the determining the support tip angle, the processor is further configured to determine the support tip angle by using the determined support position and polyline information of a lower layer.

16. The system of claim 14, wherein, for the creating, the processor is further configured to:

create a support tip at the detected support positions based on the determined support tip angle;

when the support extends downward from the detected support position, but does not touch the 3D model, create the support as a support pillar; and when the support touches the 3D model, create the support as a support lower tip.

* * * * *